United States Patent
Veenstra et al.

(10) Patent No.: US 8,381,681 B2
(45) Date of Patent: Feb. 26, 2013

(54) CLEANING CONCENTRATE SUPPLY DEVICE, AND MILKING DEVICE AND METHOD THEREWITH

(75) Inventors: Aalze Veenstra, Gouda (NL); Renatius Ignatius Josephus Fransen, Vlaardingen (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 12/858,624

(22) Filed: Aug. 18, 2010

(65) Prior Publication Data
US 2010/0307534 A1 Dec. 9, 2010

Related U.S. Application Data

(63) Continuation of application No. PCT/NL2009/000025, filed on Feb. 4, 2009.

(30) Foreign Application Priority Data

Feb. 18, 2008 (NL) ..................................... 1035033

(51) Int. Cl.
*A01J 7/02* (2006.01)
(52) U.S. Cl. .................................. 119/14.18; 119/14.08
(58) Field of Classification Search ............... 119/14.01, 119/14.08, 14.18
See application file for complete search history.

(56) References Cited

U.S. PATENT DOCUMENTS

| | | | | |
|---|---|---|---|---|
| 4,572,105 | A * | 2/1986 | Chowdhury et al. | 119/14.18 |
| 5,137,694 | A | 8/1992 | Copeland et al. | |
| 6,267,077 | B1 * | 7/2001 | van den Berg et al. | 119/14.01 |
| 6,363,884 | B1 * | 4/2002 | Oosterling | 119/14.08 |
| 6,418,958 | B1 | 7/2002 | Rossi et al. | |
| 6,572,255 | B2 * | 6/2003 | Husher | 366/132 |
| 6,645,924 | B2 * | 11/2003 | Klos et al. | 510/224 |
| 2005/0244315 | A1 | 11/2005 | Greaves et al. | |

OTHER PUBLICATIONS

International Search Report and Written Opinion of PCT/NL2009/000025.

* cited by examiner

*Primary Examiner* — Rob Swiatek
*Assistant Examiner* — Lisa Tsang
(74) *Attorney, Agent, or Firm* — Coraline J. Haitjema; David P. Owen; Hoyng Monegier LLP

(57) ABSTRACT

A receptacle for receiving cleaning concentrate, the receptacle comprising a concentrate discharge and a container having an opening, wherein a block-shaped cleaning agent is disposed on the opening in a replaceable manner, a liquid supply which is arranged for a washing out action, wherein liquid is sprayed through the opening onto the cleaning agent in order to wash out the cleaning agent and to form a cleaning concentrate, wherein a valve is provided in the concentrate discharge, which valve is controlled by a control device, wherein the control device is arranged to keep the valve closed during the washing out action, and wherein the device further comprises a signal supplier which is arranged to give a first warning signal after a predetermined phase of the washing out action.

2 Claims, 2 Drawing Sheets

US 8,381,681 B2

CLEANING CONCENTRATE SUPPLY DEVICE, AND MILKING DEVICE AND METHOD THEREWITH

CROSS REFERENCE TO RELATED APPLICATIONS

This application is a continuation of PCT application Ser. No. PCT/NL2009/000025 and filed on Feb. 4, 2009 and claims priority from Netherlands application number 1035033 filed on Feb. 18, 2008, the contents of both applications are hereby incorporated by reference in their entirety.

BACKGROUND OF THE INVENTION

1. Field of the Invention

The invention relates to a cleaning concentrate supply device, comprising a receptacle for receiving cleaning concentrate to be supplied, the receptacle comprising a concentrate discharge and a container having an opening, wherein a block-shaped cleaning agent is disposed on the opening in a replaceable manner, a liquid supply which is arranged for a washing out action, wherein liquid is sprayed through the opening onto the cleaning agent in order to thereby wash out the cleaning agent and to thereby form a cleaning concentrate, wherein a valve is provided in the concentrate discharge, which valve is controlled by a control device. The control device is arranged to keep the valve closed during the washing out action, and wherein the device further comprises a signal supplier which is arranged to give a first warning signal after a predetermined phase of the washing out action.

2. Description of the Related Art

Cleaning supply devices are known and are usually called "spray on dispensers". Conventional cleaning supply devices comprise cleaning agents that are fluid, and there are safety hazards associated with the escape of a cleaning supply such as via leaking of a cleaning supply container or the falling of the container etc. Further, known cleaning supply devices are not often ready to use and/or occupy a considerable amount of space.

BRIEF SUMMARY OF THE INVENTION

The present invention addresses these problems by providing a cleaning concentrate supply device which enables a more reliable continuous use.

In accordance with various aspects of the present invention a cleaning concentrate supply device, comprising a receptacle for receiving cleaning concentrate to be supplied, the receptacle comprising a concentrate discharge and a container having an opening, wherein a block-shaped cleaning agent is disposed on the opening in a replaceable manner, a liquid supply which is arranged for a washing out action, wherein liquid is sprayed through the opening onto the cleaning agent in order to thereby wash out the cleaning agent and to thereby form a cleaning concentrate, wherein a valve is provided in the concentrate discharge, which valve is controlled by a control device, wherein the control device is arranged to keep the valve closed during the washing out action, and wherein the device, further comprises a signal supplier which is arranged to give a first warning signal after a predetermined phase of the washing out action.

In the context of this invention, the block-shaped cleaning agent relates in this context to a cleaning agent in solid form in a container, such as a vessel or bottle. It should be noted here that powders and the like are excluded, because these are capable of being poured. In the scope of this invention, a block-shaped cleaning agent is involved, i.e. a cleaning agent that retains its shape. To this category belong not only monocrystalline blocks, but also, for example, highly viscous liquids which, under normal conditions of use, such as room temperature, cannot flow from the container, and pressed powders which, also under ordinary conditions of use, can neither flow from the container. The property of retaining its shape provides a higher safety in use, because the containers cannot leak in the case of damage of the container, falling down of the container and the like. This provides moreover a higher safety in the handling of the cleaning agent, because there is no risk, or at least a much smaller risk, of splashing or spilling. Solid cleaning agents are marketed inter alia by the company Ecolab.

Upon washing out, liquid, i.e. a solvent for the cleaning agent, such as water, is applied to the cleaning agent which, as a result, will dissolve. The solution drops formed will drip downwards into the receptacle. It should be noted that the solution formed could, in principle, be a ready-for-use solution, but it should be preferred, and it forms the subject of this invention, if a cleaning concentrate is formed. This concentrate occupies much lesser space than a ready-for-use solution and is much easier to handle. It should be noted here that during the washing out action the concentration of the cleaning concentrate is unknown, and will be known only upon completion of the washing out action. In order not to depend on an unknown concentration, the concentrate discharge is closed during the washing out action, owing to the fact that the control device keeps the valve in the concentrate discharge closed.

Further, in accordance with various aspects of the present invention, by providing a signal supplier, the user of the concentrate supply device is offered the possibility of applying in time a new amount of cleaning agent.

In particular the offered flexibility is a great advantage, because, already a long time before the amount of concentrate formed has been consumed, the signal warns the user that replacement can take place. Depending on the amount of concentrate formed and its consumption, such a period of time may increase from a few hours to days or even weeks. During this long period of time a user will not spend his time in idleness near the device, but will look for other occupations. If the cleaning concentrate supply device would subsequently complete the washing out, the user will usually not be in the vicinity, and possibly even forget the device. It may then occur that the amount of cleaning concentrate formed is consumed, so that cleaning devices making use of the cleaning concentrate should stop the cleaning. For example, and in particular, if a (whether or not automatic) milking device is cleaned by means of cleaning concentrate from the device, the cleaning should be stopped, and thus also the (whether or not automatic) milking, which is very unfavourable. The device according to the invention provides the possibility to timely renew the stock of the cleaning concentrate. In this case, it is possible for the signal supplier to give a warning signal after a predetermined phase of the washing out action, so that the user is already able to prepare the replacement of an old and washed out packing by a new packing of cleaning agent. In particular, the signal supplier is arranged to give a first warning signal if the washing out has been completed. In this case, an audible and/or visible alarm may serve as a signal supplier. Advantageously, the signal supplier is arranged to transmit a warning or alarm to a mobile phone, semaphone or email receiver. In this manner, an optimum freedom of movement of the user is provided. Such a warning or alarm may also be transmitted by means of, for example, a milking device or CRS (Centraal ReinigingsSysteem, i.e. Central Cleaning System) for said milking device.

In particular, the liquid supply is arranged to supply a predetermined amount of liquid, in particular water. By supplying a predetermined amount of liquid, the concentration of the cleaning concentrate after the washing out has been completed is in principle fixed, provided that the cleaning agent is at least substantially completely washed out. In this case, the predetermined amount of liquid to be supplied may be provided in a separate container, for example a higher positioned tank. This makes it possible for the liquid to be sprayed through the opening onto the cleaning agent, for example under the influence of gravitational force, but, for example, also by means of a pump or the like. In this context, "spraying" should be understood as any form of applying water, from any distance against gravitational force, to the cleaning agent. Owing to this, concentrate formed can flow out of the packing of the cleaning agent in a reliable manner. In one embodiment, the liquid comprises water. However, other solvents, such as alcohol or the like, may be used as well. As an alternative for an amount of liquid to be provided beforehand in a tank or the like, there may be provided a liquid conduit, in particular a water conduit, with a flow rate meter (flow meter) provided therein, which is arranged to allow, in each case, a predetermined amount of liquid to flow through.

In a further embodiment, the liquid supply is arranged to again supply the concentrate received in the receptacle, during a predetermined time, in particular via a bypass line. This embodiment provides the possibility of continuing to wash out the cleaning agent, also alter the finally desired amount of liquid has been provided. This may, for example, offer a solution for cleaning agents that dissolve with great difficulty. By recirculation of the solvent, here the concentrate can be formed and the washing out action can be completed. In this case, the liquid supply can bring the concentrate received directly from the receptacle to the cleaning agent, but this preferably takes place via a bypass line, so that a spray nozzle of the liquid supply can be positioned in an optimum manner relative to the cleaning agent to be dissolved. Preferably, there is then provided an operable slide, valve or the like, which protects the opening from the water supply, so that partial washing out of new cleaning agent is not started already upon recirculation. There may also be provided a separate conduit, separated from a spray nozzle.

In a further, the control device is arranged to start a new washing out action if the amount of concentrate in the receptacle falls below a predetermined level and a block-shaped cleaning agent is located on the container. This device provides even more flexibility in use. It now becomes possible, for example at the first time when the device is put into operation, to apply an amount of cleaning agent to the container. After washing it out, hence after the signal supplier has given the first warning signal, a new amount of cleaning agent can already be provided on the holder. However, the amount of cleaning concentrate formed is still sufficient for use during hours or even days. If the amount of concentrate in the receptacle now falls below the predetermined level, a new washing out action can be started. New cleaning concentrate is hereby formed, so that a device that makes use of the cleaning concentrate can subsequently be used again during a period of a few hours, days or weeks. Owing to this, the period in which the cleaning concentrate supply device according to the invention can operate without supervision is roughly doubled. Even more important is the already mentioned increased flexibility in use, owing to the increased available time for replacement of cleaning agent.

The predetermined level may be selected in different manners. Of course, this level may be a zero level. It is also possible, for example, to select a threshold level, which threshold level corresponds to an amount of cleaning concentrate that is sufficient for the period of time until a next minimum consumption in relation to cleaning concentrate. For example, if automatic milking devices are used, there will usually be a minimum consumption at night, for example during a few hours. If the amount of cleaning concentrate at the threshold level is sufficient to make it to the point of time at which this minimum consumption starts, new cleaning concentrate can be washed out during this minimum consumption, so that the cleaning can be continued uninterruptedly. In order to determine the amount of concentrate in the receptacle, a suitable sensor may be provided, for example in the form of electrodes in the wall of the receptacle. It will be possible for a person skilled in the art to select a suitable type of sensor without great difficulty.

In one embodiment, the device further comprises a signal supplier which is arranged to give an alarm signal if the amount of concentrate in the receptacle falls below a predetermined level and no block-shaped cleaning agent is located on the container. This device supplies an alarm signal which enables the user to take action in time. This makes it possible to prevent in an efficient manner that the cleaning will be interrupted unnecessarily. It should be noted that there may be provided a sensor or the like in order to indicate whether or not a block-shaped cleaning agent is located on the container. It is also possible to provide a condition switch which, upon replacement of the block-shaped cleaning agent, changes to a position "cleaning agent present" or is set into this position by the user, and which, for example after the washing out action, changes into the position "no cleaning agent present". As already pointed out, there may alternatively be provided a sensor, such as a weight sensor, a conductivity sensor, etc.

In such embodiments, like it is also the case in all other level-related embodiments, a level can also be deduced from a start level which is, for example, fixed after washing out, and from the cleaning concentrate consumption. The latter may, for example, be determined from the number of pumping strokes, the period of time during which cleaning concentrate is supplied multiplied by a supply speed, etc. Thus, a lowest level sensor is not necessary, because a warning can also be given after a predetermined amount has been supplied.

In a particular embodiment, the device is provided with a buffer vessel having a buffer discharge, which buffer vessel is connected to the concentrate discharge. Such a device provides the user even more freedom upon using the device. For, it will be possible for the buffer vessel to contain an amount of cleaning concentrate that is sufficient for use during cleaning, when the washing out action is being performed. In the design of a cleaning device, the buffer vessel can be dimensioned accordingly. The cleaning concentrate that goes to the buffer vessel via the concentrate discharge can go from the latter via the buffer discharge to a cleaning device.

There may be provided a pumping means in the concentrate discharge. As an alternative, there may also be provided a vacuum pump on the buffer vessel, so that it is possible subsequently to again extract cleaning concentrate from the receptacle by means of a vacuum. It is also possible to position the buffer vessel lower than the receptacle, with a valve in between, so that no pump is needed.

For example, the volume of the buffer vessel and the receptacle is substantially equal. In this embodiment, the buffer vessel has a maximum effective volume. Of course, it is possible to make the butler vessel even "much larger", but this will not contribute to the manageability of the device as a whole. In addition, the buffer vessel may also be designed as an obviously smaller one, such as, for example, half the volume of the receptacle. However, advantageously, the volume of the buffer vessel is at least equal to the amount of cleaning concentrate which is consumed during the period of time when the washing out action is performed. Of course, this amount depends on the type of use, and may, moreover, vary from day to day. Even more advantageously, the volume of the buffer vessel is at least equal to the maximum cleaning concentrate consumption during the washing out action. This ensures in a reliable manner an uninterrupted use, also during washing out.

In embodiments, the control device is arranged to move concentrate formed after the washing out action to the butler vessel. In this embodiment, it may be ensured that sufficient cleaning concentrate is present in the buffer vessel as much as possible. Owing to this, a continuous use is guaranteed to a maximum extent. For this purpose, the control device may operate a pump, a vacuum pump or the like, which is provided in the cleaning concentrate supply device, or also, for example, a valve between the receptacle and the buffer vessel, such as in the case in which the buffer vessel is positioned lower than the receptacle.

In particular, the device comprises a buffer level control device which is arranged to move concentrate to the buffer vessel if the buffer vessel contains less than a predetermined amount of liquid. Such a buffer level control device comprises, for example, a float indicator comprising a switch to be operated by the float indicator, or a level sensor which is connected to a (or the) control device. The object of such a buffer level control device is in particular to keep a substantially constant amount of cleaning concentrate in the buffer vessel. This makes it possible to guarantee substantially constant conditions during use. This relates in particular to a constant pressure of the cleaning concentrate, so that a constant amount of cleaning concentrate can be supplied to a cleaning device connected downstream thereof. Moreover, a minimum buffer time can thus be guaranteed, during which cleaning concentrate can still be supplied from the buffer vessel. A particular advantage is that the buffer vessel can in principle be designed as a smaller one, because the level in the buffer vessel does not have to vary substantially. Owing to this, deposit of the cleaning concentrate will occur less soon, involving a concentration gradient or the like. If desired, an agitator, a recirculation device or the like may be provided in the buffer vessel. Advantageously, the buffer vessel is positioned lower than the receptacle, and the device is arranged to keep the buffer vessel always substantially completely filled. If the cleaning concentrate level in the buffer vessel falls below the sensor level, a level sensor will establish that the buffer stock falls below a desired minimum level, and the signal supplier will be able to give a relevant message.

In a particular embodiment, the device comprises a signal supplier which is arranged to give a third warning signal if the amount of concentrate in the buffer vessel falls below a predetermined level. This embodiment is notably, but not solely, advantageous in embodiments comprising a buffer level control device. If the amount of concentrate falls below a predetermined level, in particular the level at which the buffer level control device switches on, it is possible to inform the user about particular conditions by means of the third warning signal. It may, for example, be an indication that no more cleaning concentrate is present in the receptacle, at least insufficient cleaning concentrate to till up the level in the buffer vessel. Of course, it is also possible that a failure has occurred in the chain liquid supply, receptacle, concentrate discharge, buffer vessel, such as, for example, a defective valve or the like. Furthermore, on the basis of this third warning signal, it is also possible to ensure that a cleaning agent stops cleaning, for example because the predetermined level involves a particular basic level or even a zero level.

In relation to the different warning and alarm signals it should be noted that, by means of these different signals, the user knows, also remote from the device, what action to take, and at what term, in particular whether or not urgency is required.

The invention also relates to a milking device for milking an animal, in particular automatically milking an animal, comprising a cleaning device having a cleaning concentrate supply device according to the invention. In particular in the case of automatic milking devices, which are able to operate without supervision of personnel, the invention provides optimum userfriendliness, because it enables to work for a longer period of time without interventions being necessary. This provides, for example, a safeguard against undesired application of new cleaning agent in the middle of the night, or the like.

In particular, the milking device comprises a plurality of cleaning concentrate supply devices, at least one of which is selected according to the present invention. In milking devices, usually a plurality of different cleaning agents are applied, which, preferably but not solely, are each capable of being supplied by means of a cleaning concentrate supply device according to the invention. Advantageously, the different cleaning concentrate supply devices are then provided with mutually different openings and/or fastening mechanisms, so that only the proper cleaning agent can be disposed on the relevant opening. It is possible, of course, to adapt the size of the amount of solid cleaning agent and of one or more associated buffer vessels to the associated consumption in the milking device. It should be noted that that cleaning device to which cleaning concentrate is supplied is capable of prepare a ready-for-use cleaning agent solution by adding additional solvent, in particular water. In a further embodiment a water conduit having an operable valve and/or flow meter in combination with a cleaning concentrate supply which is controlled by a control device is present. If a particular amount of cleaning agent is desired, there may be provided water to which a desired amount of cleaning concentrate is added by the control device. Subsequently, in the discharge conduit the desired cleaning solution is obtained by mixing. Said solution is subsequently supplied to the milking device or parts thereof.

The invention also provides a method of supplying cleaning concentrate by means of a device according to the invention, comprising the steps of a) disposing an amount of block-shaped cleaning agent on the container, b) washing out the cleaning agent, wherein the signal supplier gives a warning signal when a predetermined phase of the washing out action, in particular the completion of the washing out action, is reached, c) disposing a new amount of cleaning agent on the container.

In this method an optimum use of the device according to the invention is possible in that, upon receipt of a warning signal, a new amount of cleaning agent can be disposed on the container. Since this can take place during a long time, in particular as long as there is sufficient cleaning concentrate in the receptacle and/or the buffer vessel, if any, there is an increased flexibility and freedom for the user.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
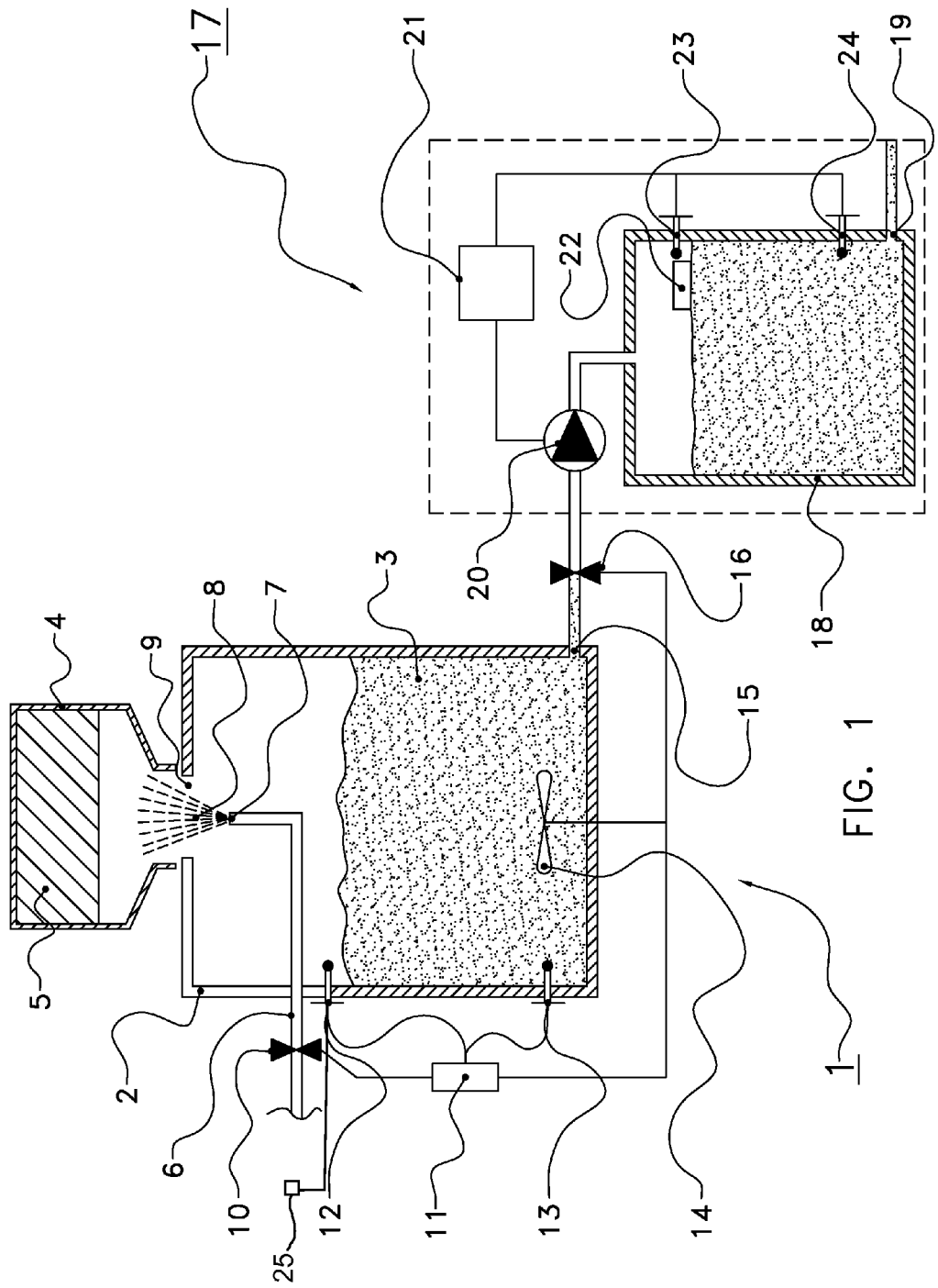
FIG. 1 shows a cleaning concentrate supply device according to the invention.

The following is a description of certain embodiments of the invention, given by way of example only and with reference to the drawings. FIG. 1 shows very schematically and in partial cross-section a cleaning concentrate supply device according to the invention, generally denoted by reference numeral 1. Here, 2 is a receptacle for cleaning concentrate 3 which is formed by spraying a solid cleaning agent 5 that is present in a packing 4, from a liquid supply 6, by means of a spray nozzle 7 which forms spray jets 8 that pass through openings 9, 10 denotes a valve which is operated by a control device 11 that also operates sensors 12 and 13.

14 denotes an optional agitator device, while 15 denotes a concentrate discharge which can be closed by means of a valve 16.

Reference numeral 17 denotes an optional buffer device comprising a buffer vessel 18 having a buffer discharge 19, a pump 20, a buffer level control device 21 having a float indicator 22 and sensors 23 and 24.

The basis of the cleaning concentrate supply device according to the invention is formed by the receptacle 2 on which a packing 4 can be disposed in which solid cleaning agent 5 is present. The solid cleaning agent 5 is, for example, a paste or a compressed powder, which retain their shape to such an extent that, in normal use, they cannot run or flow from the packing 4, at least in particular not within 10 seconds, and more in particular not within a maximum washing out time, such as a few hours. The packing may be of various materials, but consists usually and preferably of a synthetic material or a metal container or the like. It is disposed, with its opening orientated downwards, on the opening 9 of the receptacle 2. The solid cleaning agent 5 is thus ready to be sprayed.

The liquid supply 6 supplies liquid, in particular water, to the spray nozzle 7 which sprays the liquid, in one or more spray jets 8, through the opening 9 onto the solid cleaning agent 5. The liquid supply may be controlled by the valve 10 which is controlled by the control device 11. Thereby, for example, a fixed amount of liquid may be supplied. As an alternative, it is possible to supply cleaning concentrate 3 formed, via a not shown bypass line, to the liquid supply 6, so that the solid cleaning agent 5 is washed out by means of recirculation. It should be noted that Dutch patent application NL-A-1006584 which is hereby incorporated by reference in its entirety, discloses a cleaning liquid supply device wherein one or more tablets of a cleaning agent are mixed with liquid in a mixing vessel. However, it is not possible to apply this device in the case of the high concentrate solid cleaning agents for the device according to the present invention, which are used to produce a cleaning concentrate. Many of such solid cleaning agents react too violently with, for example, water, and would be unsuitable to provide the cleaning concentrate due to, for example, excessive formation of foam. Spray-on-dispensers in general do not have this disadvantage, because the water or the like is sprayed on the solid cleaning agent and runs from it almost immediately. As a result, dissolving takes place in a much more gradual and controlled manner.

In the device according to the present invention, there may further be provided sensors 12 and/or 13, which are capable of transmitting a level indication to the control device 11. Such sensors may, for example, be contact sensitive sensors or the like, which are located in the wall of the receptacle 2.

The control device 11 comprises at least one signal supplier 25, which is arranged to give a warning signal when a certain phase of the washing out action is reached. The warning signal supplied enables the user to dispose in time a new packing of new cleaning agent 5 on the opening 9. Although the receptacle 2 thus still contains an almost complete amount of cleaning concentrate, the device is fully ready to provide a new amount of cleaning concentrate, so that it can operate without supervision during a very long period of time. The signal supplier 25 may comprise an optical or acoustic alarm, and/or may advantageously transmit a message to a mobile phone, PDA, email receiver, milking robot, central cleaning system for the latter, or other mobile communication devices. For this purpose, the device may be provided with suitable transmitting or other communication equipment.

The not shown signal supplier may, for example, give the signal after, for example, half or three-quarters of the washing out action, but preferably when the washing out action is ended. For this purpose, the signal supplier 25 and/or the control device 11 may comprise a time clock, although other possibilities are not excluded. For example, a concentration of the cleaning agent and drops falling down from the packing 4 is measured by means of a conductivity meter or a dedicated sensor. If the conductivity and/or the concentration does not differ from those/that of liquid supplied (pure liquid and/or already formed recirculated concentrate), the washing out action has entirely been completed. There may also be provided a simple weighing sensor that weighs the packing 4 containing the cleaning agent 5. If the weight becomes substantially equal to that of an empty packing 4, the washing out action has been completed. Corresponding measures will easily suggest themselves to persons skilled in the art.

If the valve 10 is arranged to allow a particular amount to flow through, it is also possible for the signal supplier to react on this valve, as soon as the desired amount has been allowed to flow through. In addition, the valve 10 may be controlled by means of a signal from, for example, the sensor 12 which also indicates whether a particular amount of liquid has been let through. In addition, the sensor 12 and/or the sensor 13 may be used as follows. After the washing out action has been completed, cleaning concentrate 3 formed from the receptacle 2 will be used to form a cleaning solution. For this purpose, cleaning concentrate 3 will flow from the receptacle 2 via the concentrate discharge 15. In this manner, the liquid level in the receptacle 2 will slowly fall. For example, if said level falls below the level of the sensor 13, it is possible for this sensor 13 to give a signal by means of which a new tilling and/or washing out action can be started.

By means of such a new washing out action a safe level of cleaning concentrate 3 can be guaranteed. If no solid cleaning agent 5 should be present above the opening 9 and, consequently, no new washing out action would be possible, obviously no response was given to the first warning signal. The level of the cleaning concentrate 3 will then fall further, for example to that of the sensor 13. If this level is not attained, it will be possible to supply a warning signal by means of the not shown signal supplier. This signal is an alarm signal that requires quick action, because the stock of cleaning concentrate 3 threatens to run out definitely. A corresponding message can be transmitted, or, for example, be supplied in a visually or auditive manner.

It should be noted that the valve 16 should be closed during washing out, because the concentration of the cleaning concentrate 3 is unknown during washing out. In this manner the concentration of cleaning liquid would also be unknown, which is undesirable. After the washing out action has been completed, the valve 16 can, of course, be opened again.

In particular to be able, also during washing out, to use cleaning concentrate 3, the optional buffer device 17 has been provided. It should be noted that such a buffer device 17 is not necessary, in particular, for example, in periods of time without consumption of cleaning concentrate 3, such as, for example, in a milking parlour at night. Nevertheless, a buffer device 17 enhances userfriendliness and flexibility.

As already pointed out, the buffer device 17 comprises a buffer vessel 18 in which cleaning concentrate 3 can be provided by means of an optional pump 20. The pump 20 may also comprise a valve, provided that the buffer vessel is positioned lower than the receptacle 2. In such a case, it is possible to omit the pump even completely and to replace it functionally by the valve 16. Advantageously, the buffer vessel 18 is filled with cleaning concentrate 3 that has been formed after the washing out action. Subsequently, a new washing out action by means of new cleaning agent 5 can be started in the cleaning device 1, so that also the receptacle 2 is filled. If, finally, a new packing 4 of solid cleaning agent 5 is disposed, there will be a maximum period of time during which the device can operate as a whole.

The buffer device 17 provides cleaning concentrate from the buffer vessel 18 via the buffer discharge 19. In said buffer discharge there may, of course, be provided a valve (not shown). The drawing does show a buffer level control device 21 which allows cleaning concentrate 3 to flow to the buffer vessel 18 if the liquid level in the buffer vessel 18 falls below a particular level. This level can be determined and controlled by means of the float indicator 22 and/or the sensor 23. If the float indicator 22 falls, it will, for example, be possible that a contact is broken, so that the pump 20, or a corresponding valve, begins to operate and cleaning concentrate 3 is allowed to flow through. As a result, the level of the cleaning concentrate in the buffer vessel 18 will remain substantially constant, so that also, for example, the hydrostatic pressure in the buffer vessel will remain constant. This is advantageous for downstream connected cleaning devices.

If the level of cleaning concentrate in the buffer vessel 18 nevertheless falls, for example because there is no more cleaning concentrate 3 in the receptacle 2, and it is no longer possible to supply it, after some time the level will fall to the position of the sensor 24. At that moment, a lack of cleaning concentrate threatens to occur, and it will, for example, be possible for the device 21 to give an alarm signal which, again, requires quick action. Additionally, and advantageously, the control device 21 may also comprise a signal supplier that gives a warning signal if the level of cleaning concentrate in the buffer vessel 18 falls below the level of the sensor 23, and can no longer be replenished. In that case, for example, the cleaning concentrate 3 in the receptacle 2 is used up. On the basis thereof, either a new washing out action can be started, or a warning signal can be transmitted to the user, containing the information that cleaning concentrate is still in the buffer vessel during a certain remaining time.

The buffer level control device 21 is shown here as a separate control device. It is possible, of course, to combine the control device 11 and the buffer level control device 21 in one control device, such as a computer.

Figure 2:
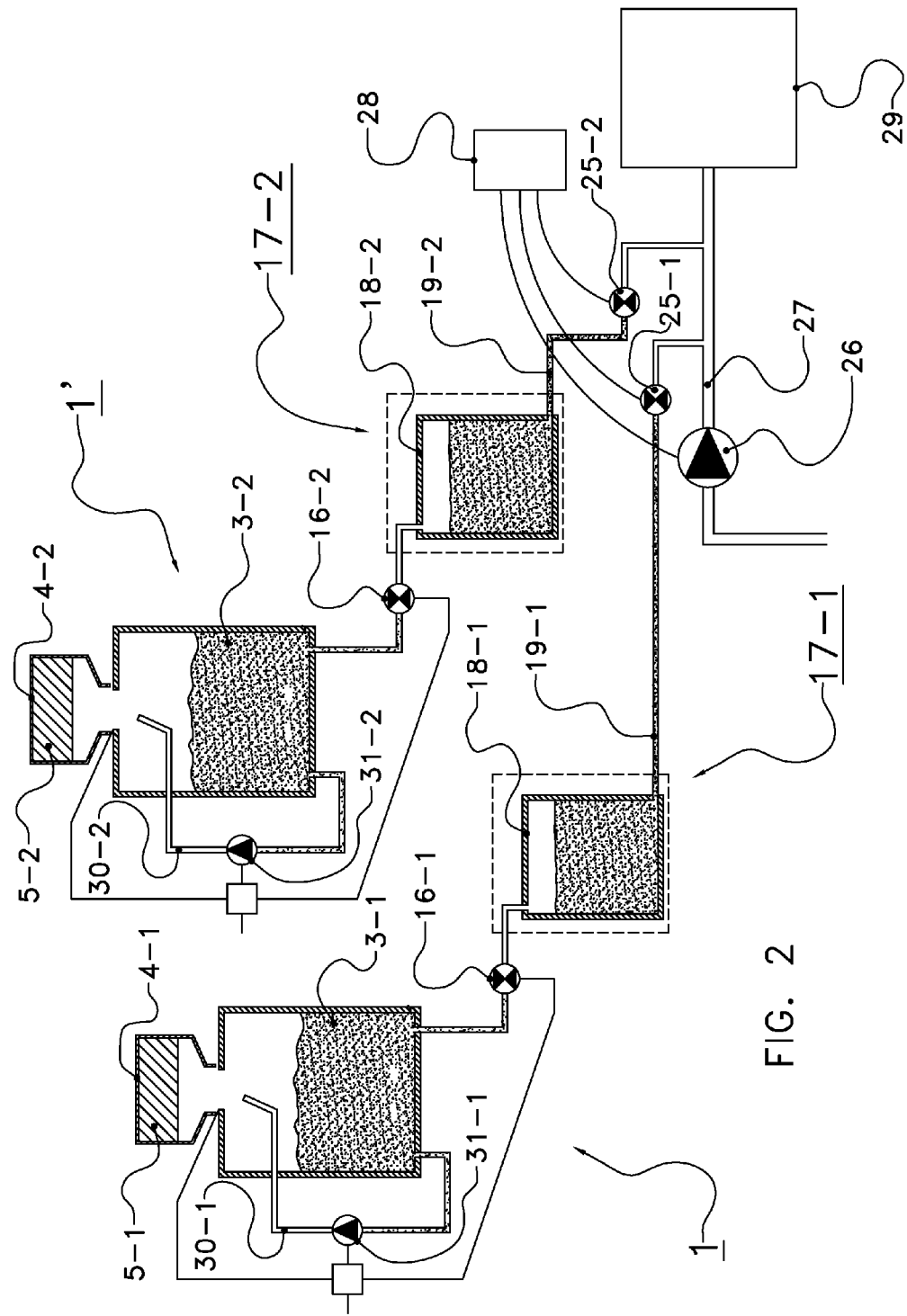
FIG. 2 shows a milking device according to the invention.

FIG. 2 shows schematically a milking device comprising a cleaning device provided with cleaning concentrate supply devices according to the invention. All this is shown schematically and partially in cross-section. Here, 1 and 1' are cleaning concentrate supply devices according to the present invention. Here, corresponding components of the first device 1 are denoted by "-1", and of the second device 1' by "-2".

The first cleaning concentrate supply device 1 comprises a first solid cleaning agent 5-1 which is washed out to a first cleaning concentrate 3-1. By means of a pump 31-1 and a bypass 30-1 cleaning concentrate 3-1 formed is recirculated and used to wash out the cleaning agent 5-1. Such a recirculation device may also be used to wash a cleaning concentrate 3-1 after some time, in order to prevent a concentration gradient. In this case, a slide or the like (not shown) may be disposed in or in front of the opening in order to protect the new cleaning agent from water (or other rinsing liquid).

There are again provided a valve 16-1, 16-2 and an optional buffer device 17-1, 17-2.

In a similar manner, there is provided a second cleaning concentrate supply device 1' according to the invention. It contains a second solid cleaning agent 5-2 in a second packing 4-2. Here, a second cleaning concentrate 3-2 is provided.

In the case of the buffer devices 17-1 and 17-2 no further details, such as butler level devices and the like, are shown, although these may, of course, indeed be provided.

There are further provided a water conduit 27 comprising a main valve and/or a flow rate meter 26, and, in the respective buffer discharges 19-1 and 19-2, in each case a valve (or (metering) pump) 25-1, 25-2, respectively, which, like the main valve 26, can be operated by means of the control device 28. Reference numeral 29 denotes very schematically a milking device.

If the milking device 29 should be cleaned, the control device 28 will rinse water through the milking device 29 by means of the main valve 26. By controlling the valves (or (metering) pumps) 25-1 and 25-2, desired first or second cleaning concentrate 3-1 or 3-2 is added to this water. This can take place both in parallel and in series. It should be noted that not both cleaning concentrate supply devices have to be used according to the present invention. However, it does offer advantages in relation to userfriendliness if both devices are provided according to the invention. Moreover, it should be noted that the control device 28 and the respective control devices 11-1 and 11-2 can again be combined in one single control device, such as a computer.

The milking device 29 may comprise a conventional milking device, but advantageously comprises one or more automatic milking devices (milking robots). Since a milking robot operates in principle without human supervision, a reliable and still flexible cleaning device, in particular having a cleaning concentrate supply device according to the present invention, is advantageous. For, in principle, maintenance (read: replacement of the solid cleaning agent) once per (for example) a few days is still necessary to keep the device in operation, but this maintenance can, in principle, take place at any moment during that period of a few days.

The embodiments shown are not meant as a limitation of the present invention. Rather, the scope of protection is determined by the appended claims. Thus, the invention has been described by reference to certain embodiments discussed above. It will be recognized that these embodiments are susceptible to various modifications and alternative forms well known to those of skill in the art. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A milking device for milking an animal comprising a cleaning device having a cleaning concentrate supply device, the cleaning concentrate supply device comprising a receptacle for receiving cleaning concentrate, the receptacle comprising a concentrate discharge and a container having an opening, wherein a block-shaped cleaning agent is disposed above the opening in a replaceable manner,
- a liquid supply which is arranged for a washing out action, wherein liquid is sprayed through the opening onto the cleaning agent in order to wash out the cleaning agent and to form a cleaning concentrate, wherein a valve is provided in the concentrate discharge, which valve is controlled by a control device, wherein the control device is arranged to keep the valve closed during the washing out action, wherein the control device comprises at least one of:
- a time clock;
- a weighing sensor to measure a weight of the cleaning agent disposed above the opening of the container; and
- one or more sensors in the receptacle for measuring at least one of: conductivity and concentration of the cleaning agent;

wherein the control device determines if the washing out action is complete based on at least one of: time, weight of the cleaning agent, conductivity of the cleaning agent, and concentration of the cleaning agent;

wherein the control device further comprises a signal supplier which is arranged to give a first warning signal after the washing out action is complete;

and wherein the milking device comprises one or more milking robots.

2. Milking device according to claim 1, wherein at least two cleaning concentrate supply devices are provided.

* * * * *